United States Patent
Roskam et al.

(10) Patent No.: US 6,872,677 B2
(45) Date of Patent: Mar. 29, 2005

(54) BRICK ADDITIVES AND METHODS FOR USING SAME

(75) Inventors: Verlyn R. Roskam, Wheaton, IL (US); Marc A. Herpfer, Thirdlake, IL (US); Allan S. Lee, Corinth, MS (US)

(73) Assignee: Oil Dri Corporation, Chicago, IL (US)

( * ) Notice: Subject to any disclaimer, the term of this patent is extended or adjusted under 35 U.S.C. 154(b) by 71 days.

(21) Appl. No.: 10/262,854

(22) Filed: Oct. 2, 2002

(65) Prior Publication Data

US 2004/0067840 A1 Apr. 8, 2004

(51) Int. Cl.⁷ .......................... C04B 33/00; C04B 33/24
(52) U.S. Cl. ...................... 501/141; 501/143; 501/144; 501/145; 501/150; 501/154; 501/153; 501/133; 501/80
(58) Field of Search ................................ 501/141, 143, 501/144, 145, 150, 154, 153, 133, 80; 106/486, 482, 483, 468; 264/680

(56) References Cited

U.S. PATENT DOCUMENTS

| | | | |
|---|---|---|---|
| 3,436,238 A | * 4/1969 | Criss | .................... 501/124 |
| 3,841,884 A | 10/1974 | Farris et al. | |
| 3,889,029 A | 6/1975 | Keller | |
| 3,944,425 A | 3/1976 | Magder | |
| 4,082,562 A | 4/1978 | Litvan et al. | |
| 4,089,920 A | 5/1978 | Stephens et al. | |
| 4,118,236 A | * 10/1978 | Erskine | .................... 501/144 |
| 4,148,662 A | 4/1979 | Hughes et al. | |
| 4,208,214 A | 6/1980 | Stein et al. | |
| 4,387,173 A | 6/1983 | Henry, Jr. et al. | |
| 4,387,195 A | * 6/1983 | Tully et al. | .................... 501/141 |
| 4,485,103 A | 11/1984 | Pasarela | |
| 4,568,390 A | 2/1986 | Gelbman | |
| 4,673,437 A | 6/1987 | Gelbman | |
| 4,729,548 A | 3/1988 | Sullins | |
| 4,780,142 A | 10/1988 | Rechter | |
| 4,812,427 A | * 3/1989 | Kohut | .................... 501/148 |
| 4,853,351 A | * 8/1989 | Takahashi et al. | .................... 501/87 |
| 5,015,606 A | 5/1991 | Lang et al. | |
| 5,219,802 A | * 6/1993 | Hsiao et al. | .................... 501/81 |
| 5,240,498 A | 8/1993 | Matalon et al. | |
| 5,252,526 A | 10/1993 | Whittemore | |
| 5,416,050 A | * 5/1995 | Lerch et al. | .................... 501/141 |
| 5,418,195 A | * 5/1995 | Kostuch et al. | .................... 501/80 |
| 6,096,126 A | 8/2000 | Tanner et al. | |
| 6,155,749 A | 12/2000 | Tanner et al. | |
| 6,458,732 B1 | * 10/2002 | Doza et al. | .................... 501/94 |
| 6,602,593 B1 | * 8/2003 | Callahan et al. | .................... 428/316.6 |
| 6,617,270 B1 | * 9/2003 | Austin et al. | .................... 501/80 |

OTHER PUBLICATIONS

Author Unknown; Fibrous Calcined Kaolin; Rubber World; Date Dec. 1986; p. 51; Publisher Unknown, no month.

Chan, C.F. et al.; Bonding Matrix for Bauxite Based, High Alumina Torpedo Ladle Brick for Temperature Firing; Ceramics International; 1994; pp. 79–84; Publisher Unknown; United Kingdom, no month.

Z. Livson, D.SC., et al., Translated Article: Dehydrated Clay Influence on Ceramic Goods Quality; Journal: Budiv. Mater. Konstar.; Date 1972; pp. 16–17; Publisher unknown; Ukrane, no month.

Author unknown; Article "North East India"; Date unknown; http://nerdatabank.nic.in/csirbircks.htm.

Author unknown; Translated Article "Pottery the ART" Date unknown; http;://members.tripd.c.m/kengergepttery/id36.htm.

N.V. Pitak, et al, Translated Article: Formation of Kaolin Refactory Materials When Heated in Various Gaseous Media; Ogneupory; 1993; pp. 5–7; Publisher Unknown; Russia.

Bentonite Performance Materials, National Bentonite Industrial Product information and data sheets, printed Jan. 14, 2004 from www.bentonite.com.

* cited by examiner

Primary Examiner—Michael Marcheschi
(74) Attorney, Agent, or Firm—Wildman, Harrold, Allen & Dixon LLP

(57) ABSTRACT

A brick additive and methods for using the brick additive are disclosed. The additive may include an internal porosity. The internal porosity may display an intra-granular internal porosity in which at least some of the pores are interconnected via an open network of pore spaces. In some embodiments, the additive is capable of maintaining its internal porosity after undergoing thermal modification via calcination, for example. In addition, brick additives of the present invention may display a large surface area.

109 Claims, No Drawings

BRICK ADDITIVES AND METHODS FOR USING SAME

FIELD OF THE INVENTION

This invention relates generally to the manufacture of fired clays, such as bricks, and more particularly to additives used during the process thereof.

SUMMARY OF THE INVENTION

Methods for making bricks are disclosed.

In one embodiment, a method for making a brick comprises the steps of providing a material capable of being formed into a brick, providing at least one particle comprising at least one pore, calcining the at least one particle, wherein the at least one pore does not collapse after the calcining step and wherein at least some of the plurality of pores are interconnected, and adding the at least one particle to the material capable of being formed into the brick.

In a further embodiment, a method for making a brick comprises providing a material capable of being formed into a brick, providing at least one particle comprising at least one pore with a pore size of about 0.0001 microns (1 Å) to about 10 microns (100,000 Å) in diameter, and adding the at least one particle to the material capable of being formed into the brick.

In yet another embodiment, a method for making a brick comprises providing a material capable of being formed into a brick, providing a plurality of particles, wherein an individual particle of the plurality of particles exhibits a surface area of between about 10 meters squared per gram and 1000 meters squared per gram, and adding the plurality of particles to the material capable of being formed into the brick.

In other aspects, the present invention is directed to finished bricks. These bricks may be made in accordance with one or more of the above-described methods.

DETAILED DESCRIPTION

Brick additives, according to illustrative embodiments of the present invention, can confer benefits to many aspects of the brick-making process. The brick additives described herein may beneficially alter the bulk properties of a brick matrix during four critical process stages (i.e. shaping, drying, firing and cooling). Throughout this application, the term brick refers generally to any clay, shale or similar earthy substance that has been fired (such as common bricks, tile and pipes). The term clay refers to any material that is substantially pliable at appropriate water contents and less pliable when fired.

The brick additive of the present invention may exhibit a certain level of porosity. According to one embodiment, individual pore size may be between about 0.0001 microns to about 10.0 microns in diameter. Pore size may display a heterogeneous distribution, ranging in size from micro-pores (about 0.0001 microns to 0.002 microns) to meso-pores (about 0.002 microns to 0.05 microns) up to macro-pores (about 0.05 microns to 10 microns). Total porosity and pore size distribution may be measured by standard porosimetry methods, or total porosity may be measured by liquid intake of the brick additive granules.

According to another embodiment, the total porosity of the brick additive may be about 10 percent or more, typically between about 20 percent and about 50 percent. Total pore volume, which is the total amount of pore volume per gram of brick additive material may be between about 0.1 cubic centimeters per gram to about 1.0 cubic centimeters per gram.

In still other embodiments, 5 percent or more of the total porosity may include an interconnected internal porosity, typically between about 15 percent and about 45 percent. The term interconnected internal porosity refers to at least some degree of interconnectivity or a network of paths between the pores within individual particles (intra-particular porosity) and/or between particles lying close together in the brick matrix (inter-particular porosity). The presence of this interconnected internal porosity may beneficially effect the brick making process in various ways.

For instance, this interconnected internal porosity may impart an anti-slumping effect during the shaping process through moisture management. Excess water can cause significant problems during shaping by saturating the surface or internal portions of the raw brick matrix. At extreme levels, excess water can transform the raw brick matrix into a slurry or paste incapable of being shaped and/or results in a low "green strength" for the matrix.

In brick matrices that employ known brick additives, although a monolayer of water may diffuse over the external surfaces of these additives, excess water may still rise to the surface of the brick matrix or form pockets of water within the matrix. With an interconnected internal porosity, excess water is not limited to traveling along the outer surface of the brick additive, but may also weave its way throughout the interconnected network of pores and/or temporarily remain within the pores themselves. In these ways, water is more uniformly distributed throughout the brick matrix, and the risk of over-saturation may be minimized. Such effective moisture management increases the self-supporting or "green" strength of the raw brick matrix.

Based on similar principles, an interconnected internal porosity may enhance devolitization of gases to prevent cracking of the brick matrix throughout the production process. During both drying and firing, volatile compounds in gaseous form, such as evaporated water, carbon dioxide and other volatile organic compounds seek to escape to the surface of the brick matrix. To avoid the violent release of these gaseous compounds into the atmosphere, currently, brick manufacturers closely monitor temperature changes during the drying and firing processes. Instead of seeking to ensure the gradual release of volatile gases into the atmosphere through monitoring temperature, according to one embodiment of the present invention, the brick additive may act as a gas pressure modulator. According to this embodiment, at least some volatile gases need not escape into the atmosphere, but may diffuse throughout the interconnected network of pores or temporarily into the pores themselves, until subsequently released in a controlled fashion.

In addition, this interconnected internal porosity may accelerate the drying rate of the brick matrix after shaping. According to one embodiment, the individual particles comprising the brick additive may comprise both internal and external surface areas. Thus, the total surface area of the individual particles in these illustrative embodiments may be between about 10 meters squared per gram and 1000 meters squared per gram. Internal surface area may be measured by known methodologies, such as surface area measurement by Ethylene Glycol Monoethyl Ether (EGME) or surface area measurement by BET nitrogen gas techniques. By spreading water or other liquids over wide surface areas, the rate of evaporation significantly increases.

An interconnected internal porosity may also advantageously decrease the density of finished bricks made in accordance with methods of the present invention. Standard finished brick has a specified size and shape based on ASTM standards. Finished bricks, according to one embodiment of the present invention, meet ASTM standards for size and shape, but may exhibit relatively lower bulk densities. Since builders and other customers incur shipping charges based only on the weight of the finished brick being shipped, decreasing the bulk density of the finished brick will save shipping costs.

More particularly, depending on the nature of the brick matrix, brick additives of the present invention may be added in an amount of up to about 20% by volume, and typically in an amount of 5% to 15% by volume. According to such embodiments, the "skeletal" solid mass of the brick additive only accounts for about 0.1 lbs to about 0.3 lbs of the finished brick. Finished brick manufactured according to these embodiments may weigh as little as 3.7 lbs. while still meeting the above-referenced ASTM standards. The reason for the lightweight aspect is based on the void space attributable to internal porosity and/or interconnectivity (bricks employing grog as an additive typically weigh 4 lbs).

According to other aspects of the present invention, certain starting materials may be employed as the brick additive. In certain illustrative embodiments, these starting materials display a high level of porosity and interconnectivity. Some materials, such as glass, vitrified clay and crushed brick exhibit low levels of porosity and interconnectivity. Other materials, such as expanded perlite and pumice exhibit a high internal porosity, but a low level of corresponding interconnectivity between individual pores. Still other materials, like raw sodium bentonite, exhibit relatively high levels of interconnectivity with low porosity. In accordance with the above-referenced embodiments of the present invention, phyllosilicate clay minerals, diatomaceous earth and zeolites may all exhibit high porosity while still maintaining a potentially high degree of interconnectivity.

Thus, according to one embodiment of the present invention, the brick additive may comprise a phyllosilicate clay mineral. The term clay mineral refers to minerals found in various clays that impart pliability to such clays. Phyllosilicates include the smectite and hormite families. The crystal habit of these families of clay is often flat, platy or book-like and most members display good basal cleavage. Although members tend to be soft, they can be remarkably resilient. In addition, phyllosilicates are often the last to chemically breakdown in erosional and weathering processes, and thus constitute a significant amount of soils and fine grained sedimentary rocks. This group may also be generally tolerant of high pressures and temperatures.

The smectite family of clay minerals includes, but is not limited to the montmorillonite, beidellite, nontronite, hectorite, vermiculite, illite and saponite species of clays, one or more of which may be present in varying amounts. Typically, smectite minerals occur as extremely small particles.

The hormite family of clay minerals includes, but is not limited to the attapulgite, often called palygorskite, and sepiolite species of clays. Some hormite minerals can form large crystals, and are often found in lucustrian or marine sediment or sometimes in hydrothermal deposits and/or soils.

Certain other embodiments of the present invention, neither of the smectite genus nor of the hormite variety, that may be employed in the brick additive include diatomaceous earth and zeolites. Diatomaceous earth is a geological deposit that may be made up of the fossilized skeletons and tests of siliceous marine and fresh water or other organisms, particularly diatoms and other algae. These skeletons may comprise hydrated amorphous silica or opal. Zeolites are porous crystalline solids that may contain silicon, aluminum or oxygen in their framework. Many zeolites, such as clinoptilolite, chabazite, phillipsite and mordenite occur naturally as minerals, and may be extensively mined in many parts of the world. Although occurring naturally, numerous zeolites may also be used in their synthetic forms such as Zeolite A, X or Y.

In addition, other minerals, aside from those described above, may appear in the brick additive. Such minerals include, but are not limited to amorphous opal CT, feldspars, kaolinite, mica and quartz.

To prepare the foregoing materials to be used as brick additives, according to an illustrative embodiment of the present invention, these materials may be mined, crushed, dried, sized or granulated into granular particles. According to one embodiment, these crushed particles may then be calcined (i.e. heated to high temperatures without fusing or vitrifying) at temperatures ranging up to and including about 1200° C. (2192° F.), and typically with temperatures ranging between 300° C. (572° F.) and 900° C. (1652° F.). Applicants have found that it is helpful to calcine the phyllosilicates, but that it is an unnecessary process step to calcine diatomaceous earth and zeolites. Both diatomaceous earth and zeolites may, however, undergo calcination without departing from the spirit of the present invention.

The actual calcining temperature depends upon the particular raw material used for the brick additive, and can be determined by one skilled in the art. If the calcining temperature and degree of thermal saturation for the particular precursor is too low, the calcined granules may rehydrate upon the addition of water. Under these circumstances, the particles may undesirably flake or disaggregate into their fundamental minerals. Care should also be taken to avoid subjecting the particles to extremely high temperatures. If the temperature is too high, vitrification and densification may occur and porosity/interconnectivity will be lost.

After calcination, individual particles of the brick additive, according to a further illustrative embodiment, include a substantially dust free granulate with particle sizes ranging from about 0.25 millimeters to about 5 millimeters in diameter. These values should be interpreted as producing a mesh size, based on the U.S. standard for measurement, between about 60 mesh and 3.5 mesh. In addition, individual particle size and shape distribution may vary widely. Particles may show a morphology ranging from angular to spheroidal, including, but not limited to lenticular (disk-shaped) or ascicular (rod-shaped).

Use of a heterogenous particle size and shape for brick additives used in the manufacture of bricks may enhance plasticity while at the same time avoiding drying and firing problems. Clays used for brick matrixes should have sufficient plasticity for efficient extrusion, but excessive plasticity may cause shrinkage during drying, which tends to yield cracking and warping of the extrudate. Fine grained particles add plasticity for ease of forming the brick's shape, while coarse grained particles decrease plasticity. Coarse grained materials may beneficially increase the drying rate of the extrudate and reduce both shrinkage and cracking during either the drying and firing stages of kiln processing. Exclusive use of coarse grained materials, however, may produce a weak and friable brick green body. As those of skill in the art will appreciate, the presence of heterogeneous particle sizes may therefore allow brick makers to maintain sufficient plasticity (from fine particles), yet still obtain rapid and complete firing of the brick matrix (from coarse particles).

In other aspects, the brick additive may serve to minimize shrinkage of the raw brink matrix. According to one illustrative embodiment, at least some particles of the brick additive do not undergo shrinkage during drying or firing, and therefore provide a rigid support structure or endoskeleton to the raw brick matrix during these processes.

The present invention is illustrated, but in no way limited by the following example:

EXAMPLE

Brick using the additive described herein was prepared by brick manufacturer A. To prepare bricks according to the present invention, Manufacturer A gathered raw material capable of being formed into a brick and then introduced the additive into the raw material through an apron feeder. This mass underwent a blending process in a pug mill, followed by extrusion under high vacuum pressure to eliminate the presence of air pockets and to produce a column of extruded raw material to be cut into green bricks. The green bricks were then stacked on a brick car and transported to a drier. The green bricks were dried and fired into finished bricks.

Although individual results may vary, depending on the nature of the raw material and equipment used, Manufacturer A reported many benefits associated with use of the additive of the present invention during the brick making process. Manufacturer A reported that its finished bricks weighed approximately 8% less than finished bricks employing known additives, such as grog. Manufacturer A further reported that use of the additive of the present invention resulted in a decrease in energy consumption during the drying and firing processes by approximately 15%, although results varied by batch. In addition, use of the additive of the present invention increased the rate of recovery of usable finished grade A bricks by at least as much as 10% in some cases.

Other benefits were recognized as well. Use of the additive of the present invention resulted in an extruded brick matrix that was firm and stable with a high degree of green strength. Moreover, use of the additive of the present invention eliminated the added time and expense of crushing grade B and C bricks and/or sacrificing grade A brick to make grog. Perhaps more importantly, replacing grog with the additive of the present invention afforded a cost savings by eliminating the need for expensive crushing machines necessary to make grog. These machines are not only expensive, but can be very costly to maintain.

Variations, modifications and other implementations of what is described herein will occur to those of ordinary skill in the art without departing from the spirit and scope of the invention. Accordingly, the invention is in no way limited by the preceding illustrative description.

What is claimed is:

1. A method for brickmaking comprising the steps of:
providing a material for forming a brick, the material comprising clay or shale;
providing a plurality of calcined particles comprising a plurality of pores, wherein at least one of the plurality of pores has a diameter between about 0.0001 microns and about 10.0 microns; and
adding the plurality of particles to the material for forming the brick.

2. The method of claim 1, wherein the plurality of calcined particles comprises a phyllosilicate clay mineral.

3. The method of claim 2, wherein the plurality of calcined particles comprises an additional mineral, selected from the group consisting of amorphous opal, feldspars, kaolinite, mica, quartz.

4. The method of claim 2, wherein the phyllosilicate clay mineral comprises smectite.

5. The method of claim 4, wherein the smectite is selected from the group consisting of montmorillinote, beidellite, nontronite, hectorite, vermiculite, illite and saponite.

6. The method of claim 2, wherein the phyllosilicate clay mineral comprises hormite.

7. The method of claim 6, wherein the hormite is selected from the group consisting of attapulgite and sepiolite.

8. The method of claim 1, wherein the plurality of particles comprises diatomaceous earth.

9. The method of claim 1, wherein the plurality of calcined particles comprises a zeolite.

10. The method of claim 1, wherein at least one of the plurality of particles has an individual particle size between about 0.25 millimeters and about 5 millimeters in diameter.

11. The method of claim 1, wherein the plurality of particles weighs between about 0.1 pounds and 0.3 pounds in a finished brick.

12. The method of claim 1, wherein the plurality of particles is present in an amount of about 5% to about 20% by volume of the material for forming the brick.

13. The method of claim 1, wherein at least some of the plurality of particles vary in size.

14. The method of claim 1, wherein the plurality of particles has a total pore volume between about 0.1 cubic centimeters per gram and about 1 cubic centimeter per gram.

15. The method of claim 1, wherein the plurality of particles has a total porosity of about 10% or more.

16. The method of claim 1, wherein between about 20% and 50% of the plurality of pores are interconnected.

17. The method of claim 1, wherein the plurality of particles has a surface area between about 10 meters squared per gram and 1000 meters squared per gram.

18. A method for brickmaking comprising the steps of:
providing a material for forming a brick, the material comprising clay or shale;
providing a plurality of particles comprising a plurality of pores, wherein at least one of the plurality of pores has a pore size of about 0.0001 to about 10 microns in diameter and at least some of the plurality of pores are interconnected; and
adding the plurality of particles to the material capable of being formed into a brick.

19. The method of claim 18, wherein the plurality of particles comprises diatomaceous earth.

20. The method of claim 18, wherein the plurality of particles comprises a zeolite.

21. The method of claim 18, further comprising calcining the plurality of particles, wherein the at least one of the plurality of pores does not collapse after the calcining step.

22. The method of claim 21, wherein the plurality of particles comprises a phyllosilicate clay mineral.

23. The method of claim 22, wherein the phyllosilicate clay mineral comprises smectite.

24. The method of claim 23, wherein the smectite is selected from the group consisting of montmorillinote, beidellite, nontronite, hectorite, vermiculite, illite and saponite.

25. The method of claim 22, wherein the phyllosilicate clay mineral comprises hormite.

26. The method of claim 25, wherein the hormite is selected from the group consisting of attapulgite and sepiolite.

27. The method of claim 22, wherein the plurality of particles comprises an additional mineral, selected from the group consisting of amorphous opal, feldspars, kaolinite, mica, quartz.

28. The method of claim 18, wherein at least one of the plurality of particles has a particle size between about 0.25 millimeters and about 5 millimeters in diameter.

29. The method of claim 18, wherein the plurality of particles weighs between about 0.1 pounds and 0.3 pounds.

30. The method of claim 18, wherein the plurality of particles is present in an amount of about 5% to about 20% by volume of the material for forming the brick.

31. The method of claim 18, wherein at least some of the plurality of particles vary in size.

32. The method of claim 18, wherein the plurality of particles has a total pore volume of up to about 1 cubic centimeter per gram.

33. The method of claim 18, wherein the plurality of particles has a total porosity of about 10% or more.

34. The method of claim 18, wherein the plurality of pores are interconnected.

35. The method of claim 18, wherein the plurality of particles exhibits a surface area between about 10 meters squared per gram and 1000 meters squared per gram.

36. The method of claim 35, wherein the surface area comprises an internal surface area and an external surface area.

37. A method for brickmaking comprising the steps of:
providing a material for forming a brick the material comprising clay or shale;
providing a plurality of particles;
calcining the plurality of particles; wherein the plurality of particles exhibits a surface area between about 10 meters squared per gram and 1000 meters squared per gram and wherein at least one of the plurality of particles comprises an internal surface area and an external surface area; and
adding the plurality of particles to the material for forming the brick after the calcining step.

38. The method of claim 37, wherein the surface area is between about 25 meters squared per gram and 1000 meters squared per gram.

39. The method of claim 37, wherein the plurality of particles comprises diatomaceous earth.

40. The method of claim 37, wherein the plurality of particles comprises a zeolite.

41. The method of claim 37, wherein the plurality of particles comprises a phyllosilicate clay mineral.

42. The method of claim 41, wherein the phyllosilicate clay comprises smectite.

43. The method of claim 42, wherein the smectite is selected from the group consisting of montmorillinote, beidellite, nontronite, hectorite, vermiculite, illite and saponite.

44. The method of claim 41, wherein the phyllosilicate clay mineral comprises hormite.

45. The method of claim 44, wherein the hormite is selected from the group consisting of attapulgite and sepiolite.

46. The method of claim 41, wherein the plurality of particles comprises an additional mineral, selected from the group consisting of amorphous opal, feldspars, kaolinite, mica, quartz.

47. The method of claim 37, wherein the plurality of particles have an individual particle size between about 0.25 millimeters and about 5 millimeters in diameter.

48. The method of claim 37, wherein the plurality of particles weighs between about 0.1 pounds and 0.3 pounds in a finished brick.

49. The method of claim 37, where the plurality of particles is present in an amount of about 5% to about 20% by volume of the material for forming the brick.

50. The method of claim 37, wherein at least some of the plurality of particles vary in size.

51. The method of claim 37, wherein the plurality of particles comprises a plurality of pores.

52. The method of claim 51, wherein the plurality of particles has a total pore volume of up to about 1 cubic centimeter per gram.

53. The method of claim 51, wherein the plurality of particles has a total porosity of about 10% or more.

54. The method of claim 51, wherein the plurality of pores are interconnected.

55. A brick comprising
a material for forming the brick, the material comprising clay or shale; and
a plurality of calcined particles comprising a plurality of pores, wherein at least one of the plurality of pores has a diameter between about 0.0001 microns and about 10.0 microns.

56. The brick of claim 55, wherein the plurality of calcined particles comprises a phyllosilicate clay mineral.

57. The brick of claim 56, wherein the phyllosilicate clay mineral comprises smectite.

58. The brick of claim 57, wherein the smectite is selected from the group consisting of montmorillinote, beidellite, nontronite, hectorite, vermiculite, illite and saponite.

59. The brick of claim 56, wherein the phyllosilicate clay mineral comprises hormite.

60. The brick of claim 59, wherein the hormite is selected from the group consisting of attapulgite and sepiolite.

61. The brick of claim 55, wherein the plurality of calcined particles comprises diatomaceous earth.

62. The brick of claim 55, wherein the plurality of calcined particles comprises a zeolite.

63. The brick of claim 56, wherein the plurality of calcined particles comprises an additional mineral, selected from the group consisting of amorphous opal, feldspars, kaolinite, mica, quartz.

64. The brick of claim 55, wherein at least one of the plurality of particles has an individual particle size between about 0.25 millimeters and about 5 millimeters in diameter.

65. The brick of claim 55, wherein the plurality of particles weighs between about 0.1 pounds to about 0.3 pounds.

66. The brick of claim 55, wherein the plurality of particles is present in an amount of about 5% to about 20% by volume of the material for forming the brick.

67. The brick of claim 55, wherein at least some of the plurality of particles vary in size.

68. The brick of claim 55, wherein the plurality of particles has a total pore volume between about 0.1 cubic centimeters per gram and about 1 cubic centimeter per gram.

69. The brick of claim 55, wherein the plurality of particles has a total porosity of about 10% or more.

70. The brick of claim 55, wherein the plurality of pores are interconnected.

71. The brick of claim 55, wherein the plurality of particles exhibits a surface area between about 10 meters squared per gram and 1000 meters squared per gram.

72. The brick of claim 71, wherein the surface area comprises an external surface area and an internal surface area.

73. A brick comprising:
a material for forming the brick, the material comprising clay or shale; and a plurality of particles comprising a plurality of pores, wherein at least one of the plurality of pores has a pore size of about 0.0001 to about 10 microns in diameter and at least some of the plurality of pores are interconnected.

74. The brick of claim 73, wherein the plurality of particles comprises diatomaceous earth.

75. The brick of claim 73, wherein the plurality of particles comprises a zeolite.

76. The brick of claim 73, wherein the plurality of particles is calcined and the at least one pore does not collapse after calcination.

77. The brick of claim 76, wherein the plurality of particles comprises a phyllosilicate clay mineral.

78. The brick of claim 77, wherein the phyllosilicate clay mineral comprises smectite.

79. The brick of claim 78, wherein the smectite is selected from the group consisting of montmorillinote, beidellite, nontronite, hectorite, vermiculite, illite and saponite.

80. The brick of claim 77, wherein the phyllosilicate clay mineral comprises hormite.

81. The brick of claim 80, wherein the hormite is selected from the group consisting of attapulgite and sepiolite.

82. The brick of claim 77, wherein the phyllosilicate clay mineral comprises an additional mineral, selected from the group consisting of opal, feldspars, kaolinite, mica, quartz, pyrite and gypsum.

83. The brick of claim 73, wherein the at least one of the plurality of particles has an individual particle size between about 0.25 millimeters and about 5 millimeters in diameter.

84. The brick of claim 73, wherein the plurality of particles weighs between about 0.1 and 0.3 pounds.

85. The brick of claim 73, wherein the plurality of particles is present in an amount of about 5% to about 20% by volume of the material for forming the brick.

86. The brick of claim 73, wherein at least some of the plurality of particles vary in size.

87. The brick of claim 73, wherein the plurality of particles has a total pore volume of up to about 1 cubic centimeter per gram.

88. The brick of claim 73, wherein the plurality of particles has a total porosity of about 10% or more.

89. The brick of claim 73, wherein at least 20% of the plurality of pores are interconnected.

90. The brick of claim 84, wherein the plurality of particles exhibits a surface area between about 10 meters squared per gram and 1000 meters squared per gram.

91. The brick of claim 90, wherein the surface area comprises an internal surface area and an external surface area.

92. A brick comprising:
a material for forming the brick, the material comprising clay or shale; and
a plurality of calcined particles, wherein the plurality of particles exhibits a surface area between about 10 meters squared per gram and 1000 meters squared per gram before the brick is fired and wherein the surface area comprises an internal surface area and an external surface area.

93. The brick of claim 92, wherein the surface area is between about 300 and 600 meters squared per gram.

94. The brick of claim 92, wherein the plurality of particles comprises diatomaceous earth.

95. The brick of claim 92, wherein the plurality of particles comprises a zeolite.

96. The brick of claim 92, wherein the plurality of particles comprises a phyllosilicate clay mineral.

97. The brick of claim 96, wherein the phyllosilicate clay mineral comprises smectite.

98. The brick of claim 97, wherein the smectite is selected from the group consisting of montmorillinote, beidellite, nontronite, hectorite, vermiculite, illite and saponite.

99. The brick of claim 96, wherein the phyllosilicate clay mineral comprises hormite.

100. The brick of claim 99, wherein the hormite is selected from the group consisting of attapulgite and sepiolite.

101. The brick of claim 96, wherein the plurality of particles comprises an additional mineral, selected from the group consisting of amorphous opal, feldspars, kaolinite, mica, quartz.

102. The brick of claim 92, wherein at least one of the plurality of particles has an individual particle size between about 0.25 millimeters and about 5 millimeters in diameter.

103. The brick of claim 92, wherein the plurality of particles weighs between about 0.1 pounds and 0.3 pounds in a finished brick.

104. The brick of claim 92, wherein the plurality of particles is present in an amount of about 5% to about 20% by volume of the material for forming the brick.

105. The brick of claim 92, wherein at least some of the plurality of particles vary in size.

106. The brick of claim 92, wherein the plurality of particles comprises a plurality of pores.

107. The brick of claim 106, wherein the plurality of particles has a total pore volume of up to about 1 cubic centimeter per gram.

108. The brick of claim 106, wherein the plurality of particles has a total porosity of about 10% or more.

109. The brick of claim 106, wherein the plurality of pores are interconnected.

* * * * *

UNITED STATES PATENT AND TRADEMARK OFFICE
CERTIFICATE OF CORRECTION

| | | |
|---|---|---|
| PATENT NO. | : 6,872,677 B2 | Page 1 of 1 |
| APPLICATION NO. | : 10/262854 | |
| DATED | : March 29, 2005 | |
| INVENTOR(S) | : Verlyn R. Roskam, Marc A. Herpfer and Allan S. Lee | |

It is certified that error appears in the above-identified patent and that said Letters Patent is hereby corrected as shown below:

On the title page (73):
"Assignee: Oil Dri Corporation, Chicago, IL (US)" should read as follows:

--Assignee: Oil-Dri Corporation of America, Chicago, IL (US)--.

Signed and Sealed this

Fourteenth Day of August, 2007

JON W. DUDAS
*Director of the United States Patent and Trademark Office*